United States Patent [19]

Raker

[11] Patent Number: 5,064,328
[45] Date of Patent: Nov. 12, 1991

[54] SAFETY INTERLOCK SYSTEM

[75] Inventor: John W. Raker, North Olmsted, Ohio

[73] Assignee: K. S. Macey Machine Company, Inc., Cleveland, Ohio

[21] Appl. No.: 459,139

[22] Filed: Dec. 29, 1989

[51] Int. Cl.$^5$ .............................................. B42C 1/00
[52] U.S. Cl. ........................................ 412/12; 227/1
[58] Field of Search .............................. 412/12; 227/1

[56] References Cited

U.S. PATENT DOCUMENTS

| | | | |
|---|---|---|---|
| 3,816,866 | 6/1974 | Miaskoff et al. | 412/12 |
| 4,614,290 | 9/1986 | Boss | 227/1 |
| 4,621,757 | 11/1986 | Osako | 412/12 X |
| 4,767,250 | 8/1988 | Garlichs | 227/1 X |

Primary Examiner—Paul A. Bell
Attorney, Agent, or Firm—Fay, Sharpe, Beall, Fagan, Minnich & McKee

[57] ABSTRACT

An electric circuit interlock system which senses the position of the plurality of doors associated with a machine enclosure, the enclosure providing a safety guarding. The electric safety interlock system disables a main drive motor system when any one of the plurality of access doors is ajar. A manual override jog button is integrated into the electric safety interlock system at each of the plurality of access doors for jogging the main drive motor system. When any more than one of the plurality of access doors are open, each and every associated manual jog buttons must be actuated simultaneously to jog the main drive motor system (logical AND).

5 Claims, 2 Drawing Sheets

SAFETY INTERLOCK SYSTEM

BACKGROUND OF THE INVENTION

This application pertains to the art of electric machine controls and more particularly to electric safety interlock systems for machine enclosures and other guarding.

The invention is particularly applicable to a paper binding machine having a continuously operating conveyor which transports groupings of folded signatures first to an inspection station, then to a binding station, and lastly to a trimmer station, and will be described with particular reference thereto although it will be appreciated that the invention has broader applications such as paint spray systems, parts handling systems, or any other system utilizing a conveyor or the like.

Paper binding machines generally comprise a "assembly line" type mechanical apparatus to produce booklets or magazines from single printed sheets. At the input side, single printed sheets or signatures, are loaded into pockets on feeders. In systems having folded signatures, the feeders supply a continuously operating conveyor with the folded signatures sequentially forming collated gathers which are transported by the conveyor system to an inspection station. A single main motor drive system is utilized to power the entire apparatus including the conveyor, the feeder, the trimmer, and the binder. At each pocket along the conveyor route, an additional signature is stacked on the gather to thus form a booklet.

It is evident, therefore, that it is possible to increase the number of pages for a given booklet by adding feeders having additional pockets and by increasing the length of the conveyor system. It is not uncommon for a paper binding machine to have four modular feeder units each having two signature carrying pockets to produce a booklet comprising thirty-two (32) printed pages.

To ensure operator safety, an enclosure is provided around the feeder units, along with various other guardings around the other moving mechanical parts comprising the paper binding machine. To provide for access into the safety enclosure, maintenance access doors are provided at various strategic locations around the paper binding machine. It has heretofore been the practice to disable the main motor drive upon the opening of any of these maintenance access doors. It has also been the practice to provide a manual override jog button at each of the maintenance doors to enable maintenance personnel to jog the machine and its associated components to determine possible causes of machine malfunction while observing the mechanism while in motion.

One of the problems has been the use of two manual override push buttons by two operators working independently though simultaneously. The problem arises when unbeknownst to a first maintenance personnel, a second maintenance personnel activates the manual override jog pushbutton. The resultant machine motion could, depending upon the circumstances, severely injure the first maintenance personnel who did not request a manual override jog. The danger becomes more pronounced as additional feeders are added to the binding machine to produce a booklet with more pages because the additional associated enclosures further obstruct the view of certain areas surrounding the machine.

The present invention contemplates new and improved electric circuit apparatus and method which overcomes the above-referred problems and others and provides an enclosure safety interlock system which is simple, economical, and fail-safe.

BRIEF SUMMARY OF THE INVENTION

In accordance with the present invention, an enclosure safety interlock system of the general type described is provided wherein the manual override jog buttons are made to jog the machine only when each of the maintenance personnel at opened access doors simultaneously request for an override jog. Upon release of the manual override jog button by any maintenance personnel at an open maintenance access door, the machine main drive system returns immediately to a disabled state.

The principal object of the invention is to provide a safe and fool-proof manual override jog function to maintenance personnel to facilitate machine debug and setup without unexpected machine motion when more than one such person works simultaneously on a single given machine.

Another object of the present invention is to provide a visual indication of a potential safety problem in the form of an indicator light.

Further advantages will be apparent to on of ordinary skill in the art upon a reading and understanding of the subject specification.

BRIEF DESCRIPTION OF THE DRAWINGS

The invention may take physical form in certain parts and arrangements of parts, a preferred embodiment of which will be described in detail in this specification and illustrated in the accompanying drawings wherein.

DETAILED DESCRIPTION OF THE PREFERRED EMBODIMENT

Figure 1:
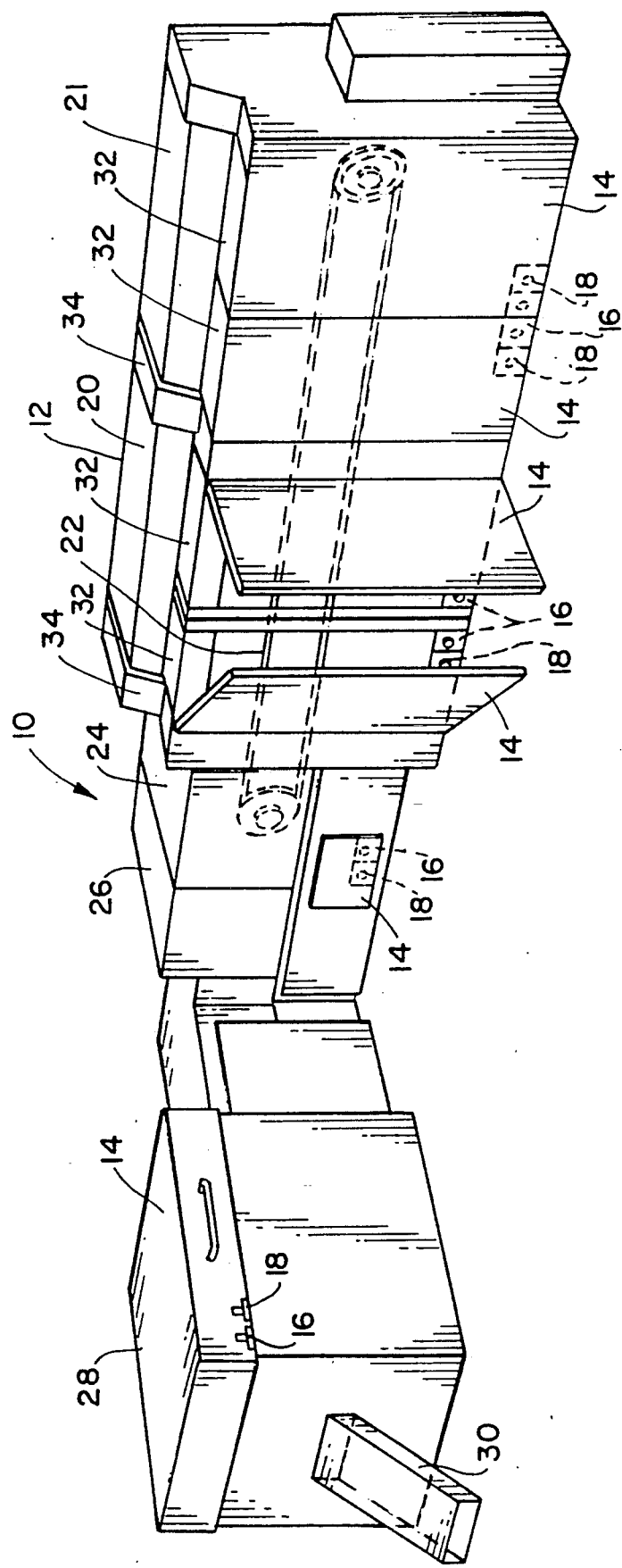
FIG. 1 is an overall pictorial schematic illustration of a paper binding machine; and, FIG. 2 is an electrical schematic illustration of a preferred embodiment of the safety interlock system of the present invention.

Referring now to the drawings, wherein the showing are for the purposes of illustrating the preferred embodiment of the invention only and not for the purposes of limiting same, FIG. 1 shows a paper binding machine 10 with an enclosure 12 having multiple maintenance access doors 14, each of the maintenance doors having a door closed switch 16 and a manual override jog pushbutton 18.

The paper binding machine 10 shown in FIG. 1 utilizes two feeder modules 20, 21. Each of the feeder modules has two single feeder sections 32 for feeding signatures into the binding machine 10. Also, each feeder module can be detached from the binding machine using a clutch to "dephase" the module. Access to the dephase clutches is provided by the dephase access door 34. A conveyor in the form of a saddle chain 22 delivers the groups of stacked signatures to an inspection area 24 which determines whether or not the size of the stack, that is, the number of pages, is within a predetermined tolerance.

From the inspection area 24, the stacked gathers are transported to a stitcher area 26. In the stitcher area 26, the stacked gathers are either stapled or woven into a bound booklet.

Lastly, the bound booklets are transported to a trimmer area 28 via a second conveyor system comprised of an upper and lower belt drive mechanism (not shown). In the trimmer area 28, the booklets are trimmed to a predetermined size and ejected from the machine through an exit chute 30.

Figure 2:
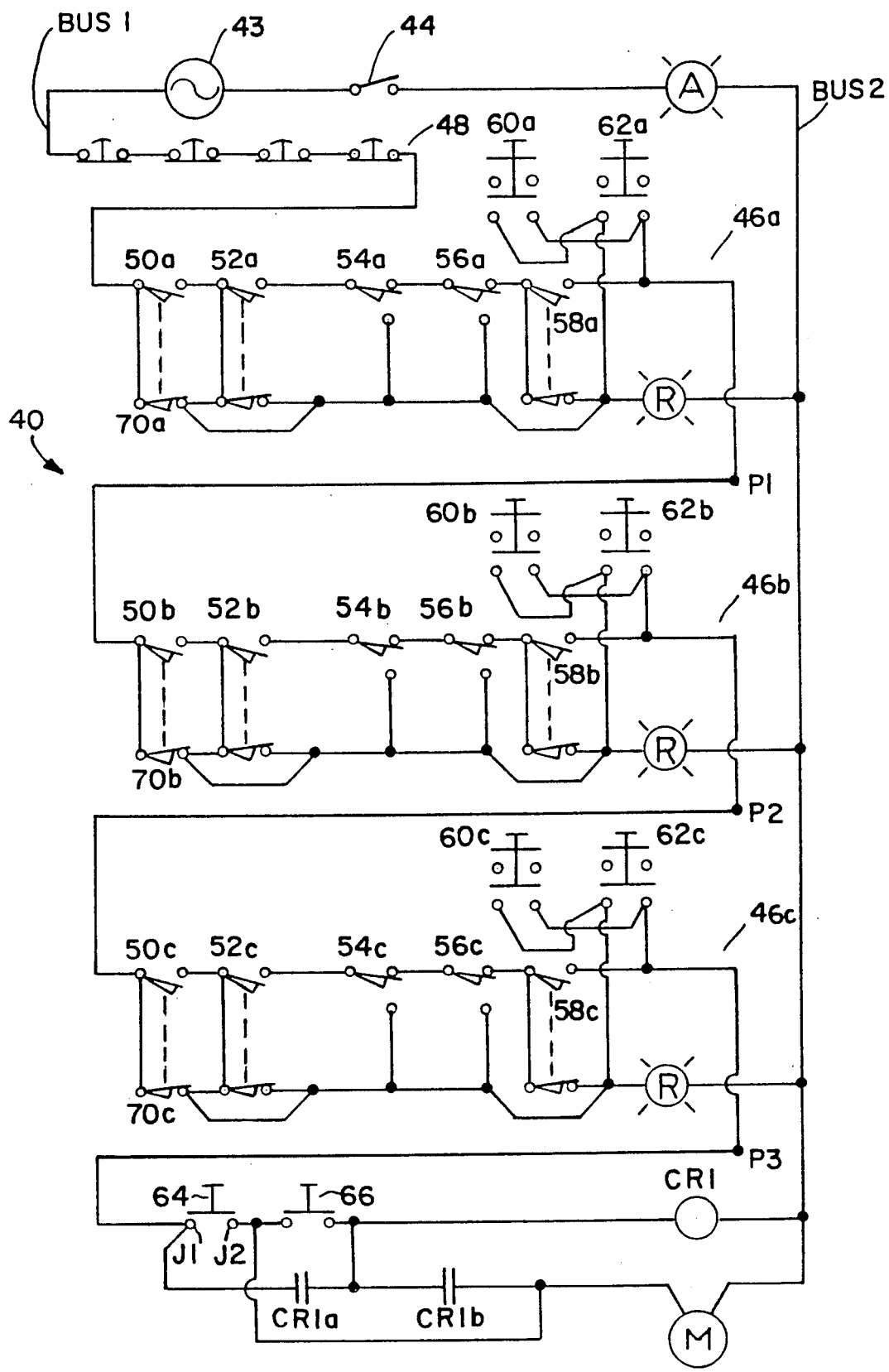

Referring now to FIG. 2, the improved enclosure safety interlock system 40 is shown. The system is provided with line power through bus 1 and bus 2. The source of the line power is shown as a single phase alternating voltage source 43 delivered through disconnect 44. As shown in the FIGURE, when the disconnect 44 is closed an amber indicating light A is illuminated.

The safety interlock system 40 as shown in FIG. 2 is, for the purposes of explanation, comprised of three typical maintenance door circuits 46a–46c which provide a safety interlock for three maintenance doors, 14 on the enclosure 12. The maintenance door circuits 46a–46c form a serial link between bus 1 and an input terminal on the single phase drive system motor M. A break in any one of the maintenance door circuits 46a–46c, would interrupt and disable the operation of the single phase drive system motor M.

Because of the serial nature of the circuit layout, latching-type emergency stop pushbuttons are provided to form an E-stop string 48. The individual mushroom head buttons comprising the E-stop string 48 are generally "twist-type" and are strategically located in areas around the machine enclosure to enable an operator to easily actuate the buttons in the event an emergency arises. These single circuit latching break buttons and their placement in such serial relationship is well known in the art.

The switches, relays, and lamps comprising the present invention are individually all well known in the art. Both the front feeder door closed limit switch 50a and the rear feeder door closed limit switch 52a, are common dual circuit switches having a normally open set of contacts and a normally closed set of contacts. The front feeder door closed limit switch 50a closes when the maintenance door 14 is in a closed position. Correspondingly, the normally closed contact 70a is opened when the maintenance door 14 is in a closed position.

The left feeder not jammed limit switch 54a and the right feeder not jammed limit switch 56a are common normally open, held closed, limit switches. Both feeder not jammed limit switches 54a and 56a are held closed when the feeder operates without a paper jam. Upon the occurrence of a paper jam, the corresponding feeder not jammed limit switch opens breaking the circuit.

The front manual override jog pushbuttons 60a–60c and the rear manual override jog pushbuttons 62a–62c are common dual, or two-circuit, momentary make pushbuttons. The switches are activated by depressing the button holding the contacts in a closed position, and deactivated by releasing the button allowing the plunger to spring back into an open circuit position. Similarly, the console jog pushbutton 64 and console run pushbutton 66 are common single circuit momentary make pushbuttons well known in the art. Also well know in the art is the contact relay coil CR1 of the present invention having two normally open contacts $CR1_a$ and $CR1_b$. The contact relay coil CR1 used in the circuit of the present invention has an alternating current-type actuating coil.

Now, with continued reference to FIG. 2, the initiation of a motor run condition will be described. Assuming that the E-stop string 48 and each of the maintenance door circuits 46a–46c are in a condition reflecting that the machine is safe for operation; that is, all maintenance doors 14 are closed, all feeders 32 are not jammed, and all dephase access doors 34 are closed, bus 1 will be electrically connected to point P3. In order for the single phase drive system motor M to operate, each of its terminals must be singly connected to bus 1 and bus 2. The simultaneous activation of the console jog pushbutton 64 with the console run pushbutton 66 energizes the contact relay coil CR1, the contact relay coil having two normally open contacts $CR1_a$ and $CR1_b$. The simultaneous depression of these two console pushbuttons 64, 66, effectively closes the normally open contacts $CR1_a$ and $CR1_b$, thus providing the single phase drive system motor M an electrical connection to both bus 1 41 and bus 2 42.

As seen in FIG. 2, the run circuit is provided with a contact relay coil CR1 and its associated $CR1_a$ and $CR1_b$ to effectuate an electrical latch. When contact relay coil CR1 is energized and thus closes contact $CR1_a$, the bus 1 is effectively tied to the contact relay coil CR1 through contact $CR1_a$. The release of the console jog pushbutton 64 and console run pushbutton 66 has no effect on the condition of contact $CR1_a$ because it is effectively held in a closed position by the already energized contact relay coil CR1. However, any electrical break in the circuit between bus 1 and point P3 will operate to de-energize the contact relay coil CR1 and thus drop out contact $CR1_a$ and $CR1_b$ to disable the single phase drive system motor M. This coil and contact arrangement providing a latch mechanism is well known in the art.

Still with continued reference to FIG. 2, a manual override jog will be described commencing with the opening of a single front maintenance door 14 which opens one of the feeder closed door limit switches 16. For this example, it will be assumed that the front feeder door closed limit switch 50a is opened by a setup man opening a maintenance door 14. The resultant break in the maintenance door circuit 46a by the opening of the front door closed limit switch 50a effectively detaches bus 1 from point P1. Thus removed, bus 1 no longer being applied to contact relay coil CR1, effects an opening of contacts $CR1_a$ and $CR1_b$ to disable the single phase drive system motor M. Also, opening the front maintenance access door closes the normally closed front feeder door closed limit switch 70a illuminating indicator lamp R in the maintenance door circuit 46a.

Somewhere near the maintenance door area on the machine enclosure, a front manual override jog pushbutton 60a is provided. A set-up man may depress the pushbutton 60a to close the circuit from bus 1 to point P1 through the normally closed front feeder door closed limit switch 70a. If no other maintenance doors are open, maintenance door circuits 46b and 46c will provide a continuous closed circuit between points P1 and P3 to point J1 at the console jog pushbutton 64.

The front manual override jog pushbuttons 60a–60c are dual contact, normally open-type switches. On the second set of contacts, points J1 and J2 are connected in a bus-type arrangement with the console jog pushbutton 64 contacts J1 and J2. Thus, the actuation of the front manual override jog pushbutton 60a serves a dual purpose. The first purpose being the closing of the circuit from bus 1 to point P3 through the normally closed front feeder door closed limit switch 70a. The second function serving to effect a parallel closing of the circuit between points J1 and J2 at the console jog pushbutton 64 as if the console jog pushbutton 64 had been closed. Since the console run pushbutton is not actuated by the front manual override jog pushbutton 60a, the contact relay coil CR1 is not energized, and thus the single phase drive system motor M is not enabled continuously but, rather, is enabled for only as long as the front manual override jog pushbutton 60a is depressed.

In the situation where two maintenance personnel are working on the machine simultaneously, it is possible that two maintenance doors 14 be opened at once. In the circuit shown in FIG. 2, the opening of two maintenance doors 14 would, for example, open the front feeder door closed limit switch 50a at one access door area of the machine, and also open front feeder door closed limit switch 50c at another access door area of the machine. This condition would serve to detach both points P1 and P3 from bus 1. A first maintenance worker may wish to establish a jog of the single phase drive system motor M by depressing the front manual override jog pushbutton 60a. In doing so, the maintenance worker would tie point P1 to bus 1. However, because of the open front feeder door closed limit switch 50c, point P3 remains unconnected with bus 1. Only after both operators depress their respective front manual override drive jog pushbuttons 60a and 60c, will points P1 and P3 be connected to bus 1 to provide the single phase drive system motor M with the alternating voltage source 43 to effectuate the machine jog.

From the circuit diagram of FIG. 2, it is obvious that in the above-described situation, both operators must request a machine jog by actuating their respective front manual override jog pushbuttons 60a, 60c, to effectuate a jog. The circuit thus provides a hardware logical AND between the manual jog override pushbuttons at access door areas having an open access door. Further, in the event that either of the maintenance operators release their respective jog pushbuttons, the circuit is arranged to detach the respective points P1 or P3 from bus 1 as described above. The circuit thus provides a safety interlock system wherein a manual override jog condition is possible only when each of the manual override jog pushbuttons are activated at each of the access door areas having an open maintenance door.

Other forms of the safety interlock system of the present invention are possible including the addition of more maintenance door circuits. Also, it is possible to implement the safety interlock system of the present invention in a programmable controller or other machine control using software methods as appreciated by one having ordinary skill in the art.

It will now be apparent to those of reasonable skill in the art that other embodiments, improvements, enhancements, and other changes can be made to the present apparatus consistent with the above specification and within the scope of this patent, which is limited only by the following claims or the equivalents thereof.

Having thus described the invention, it is now claimed:

1. A safety interlock system for use with an apparatus having a movable mechanism surrounded by a safety guarding, the system comprising:

a plurality of serially-connected disabling switch means for disabling motion of the movable mechanism, each of the plurality of disabling switch means being disposed in access areas of the apparatus providing an opening through the safety guarding and each generating a disable signal wherein the respective accessed area is in a predetermined unsafe condition;

a plurality of serially-connected jog switch means, each jog switch means of the plurality being disposed in the access areas of the apparatus and each being operatively associated with a one of the plurality of disabling switches sharing a common access area as a disable-jog switch means pair, each jog switch means generating a jog signal when actuated; and, control means for activating the movable mechanism when each of at least two disable/jog switch means pairs are sensed having a presence of the disable signal and the jog signal.

2. An improved safety interlock system for use with a machine having a main drive motor system and an enclosure which surrounds the machine for guarding against intrusion therein, the interlock system comprising:

a plurality of access door areas, each access door area comprising i) a movable panel means for providing access into the enclosure, ii) a first sensing means for detecting the movable panel means in a closed position and in an open position and for providing a panel closed signal representative of the movable panel means in the closed position, and iii) an override jog switch means for providing an override jog signal; and, a control circuit means for disabling the main drive motor system in an absence of the panel closed signal from each of said plurality access door areas, the control circuit means comprising jogging means for jogging the main drive motor system upon a presence of the override jog signal and an absence of the panel closed signal, at each of at least two of said plurality of access door areas having the movable panel means in the open position.

3. The improved safety interlock system of claim 2 wherein the control circuit means comprises a serial interconnection of the first sensing means and the override jog switch means of each of the plurality of access door areas.

4. The improved safety interlock system of claim 3 further comprising:

an indicating means provided at each of the plurality of access door areas for indicating an absence of the panel closed signal;

a main drive motor system latch means for latching the main drive motor system in a run condition, the run condition being a sustained machine operation; and, a safety interrupt means for interrupting the sustained machine operation.

5. In a paper binding machine having a feeder portion for feeding signatures via a feeder drum onto a continuously operating conveyor system to form gathers, a dephase portion provided to detach the feeder portion from a main drive system, a stitcher for binding the gathers into a stitched gather, a trimmer portion for trimming the thus bound signatures, and a plurality of access doors providing a plurality of maintenance entrances into said paper binding machine, the improved safety interlock system comprising:

a plurality of first sensing means, each of said first sensing means for sensing a feeder access door in an open position and providing a feeder door open signal representative of the feeder access door open position;

a plurality of second sensing means, each of said second sensing means being operatively associated with a one of said plurality of first sensing means, for sensing a feeder drum operative status in a jammed state and providing a jammed drum signal representative of the feeder drum jammed state operative status;

a plurality of third sensing means, each of said third sensing means being operatively associated with a one of said plurality of second sensing means, for sensing a dephase access door in an open position and providing a dephase door open signal representative of the dephase access door open position;

a control means for controlling the main drive system, the control means disabling the main drive system upon a first predetermined combinational condition of said feeder door open signal, said jammed drum signal and said dephase door open signal; and an override means for overriding said control means to selectively enable said main drive system responsive to a set of override signals equal in magnitude to a cumulative set of associated feeder door open signals, jammed drum signals, and dephase door open signals when the cumulative set is at least two.

* * * * *